J. C. NELSON.
Improvement in Sawing-Machines.
No. 129,747. Patented July 23, 1872.
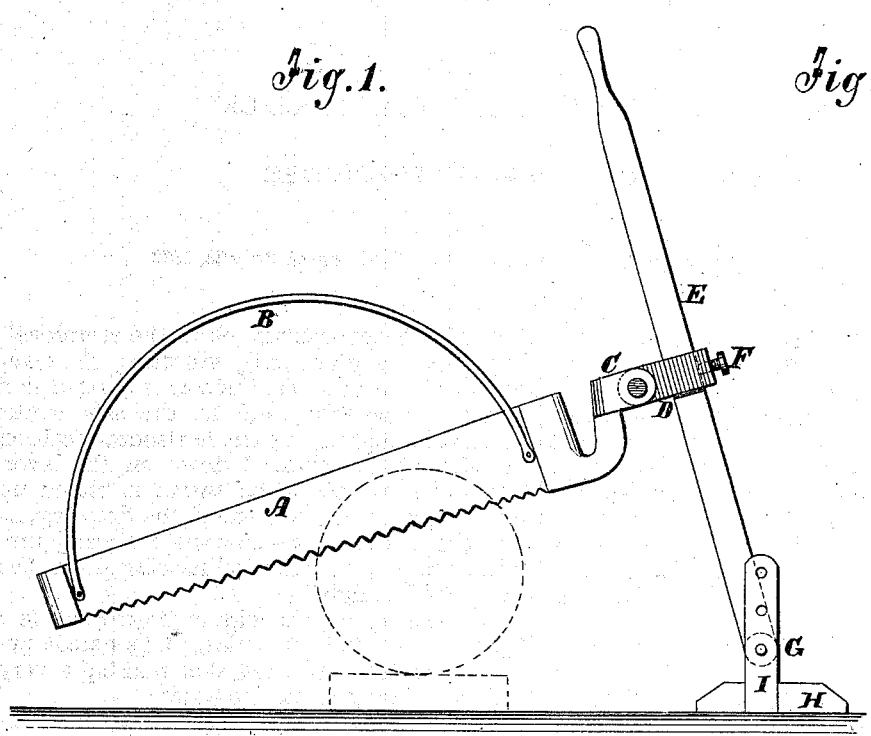
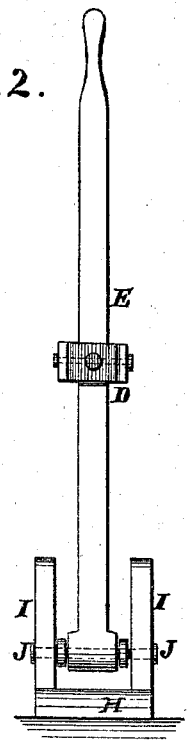

UNITED STATES PATENT OFFICE.

JOHN C. NELSON, OF KINGSTON, TENNESSEE.

IMPROVEMENT IN SAWING-MACHINES.

Specification forming part of Letters Patent No. 129,747, dated July 23, 1872.

Specification describing a new and useful Improvement in Apparatus for Operating Crosscut-Saws, invented by JOHN C. NELSON, of Kingston, in the county of Roane and State of Tennessee.

The object of this invention is to facilitate the operation of sawing timber across the grain; and it consists in a bow-spring for straining the saw, and in a vibrating lever with a slide attached to the shank of the saw, the arrangement being as hereinafter described.

In the accompanying drawing, Figure 1 represents a side elevation, showing the device as when in operation. Fig. 2 is an end view.

Similar letters of reference indicate corresponding parts.

A is the saw. B is a bow-spring of steel, of sufficient strength when applied, as seen in Fig. 1, to keep the saw strained suitable for use. C is the shank of the saw. D is a box-slide on the lever E, to which the shank of the saw is removably attached. The slide is held in any desired position on the lever by the set-screw F. G represents the lever-stand, consisting of a bed-piece, H, with two uprights, I I, attached thereto. The lever is connected with the stand by means of an adjustable pin, J, as seen in the drawing.

The saw is fed down by its own weight and that of the bow-spring, while the reciprocating motion is given it by vibrating the lever by hand. In practice, the saw is started in a horizontal position, and as the saw works down it is kept in a nearly horizontal position by slipping the slide D down on the lever. The log or timber to be sawed is raised up from the ground, as seen in the drawing, so that the motion of the saw will be nearly uniform, and the necessity of moving down the slide will be slight.

For sawing in two logs or timber this is a light and convenient device. One person operates the saw with ease, thus making a very material saving in motive power.

I do not confine myself to the precise form or arrangement of any of the parts described, as variations may be made without departing from my invention.

Having thus described my invention, I claim as new and desire to secure by Letters Patent—

An apparatus for operating crosscut-saws, consisting of the slide D, lever F, stand G, and bow-spring B, arranged substantially as described.

JOHN COLUMBUS NELSON.

Witnesses:
J. T. McEWEN,
G. Q. GUMTHER.